Patented Sept. 12, 1939

2,173,004

UNITED STATES PATENT OFFICE 2,173,004

ANTISEIZING SCREW THREADED UNIT

Charles E. S. Place, Detroit, Mich., assignor to Clare L. Brackett, Detroit, Mich.

No Drawing. Original application January 21, 1937, Serial No. 121,713. Divided and this application September 7, 1938, Serial No. 228,876

8 Claims. (Cl. 85—46)

This invention relates to the art of screw threaded fastening elements and the present application is a division of my copending application Serial No. 121,713, filed January 21, 1937.

When contacting threaded members such as nuts, bolts, screws and the like, are subjected to high temperatures in service, as in the case of the exhaust pipe or manifold assemblies of internal combustion engines, or in furnaces, boiler or superheater units, where temperatures range from 600° F. to 1200° F., an inevitable scale formation occurs on the thread surfaces due to such causes as oxidization, fusing and brazing. In a very short time the contacting threaded surfaces of engaged elements become firmly bound or "seized" together, and to so tenacious an extent that their disengagement becomes a matter of great difficulty. In fact, it is generally the case that disengagement of such elements can only be effected at the expense of irreparable damage to their threads or by cutting away a portion of the body structure. Frequently the use of a chisel or hack-saw must be resorted to.

An object of the present invention is to provide a screw threaded fastening element having thread surfaces inherently incapable of seizing under high temperature service conditions.

Another object is to provide a screw threaded fastening element having its screw threaded surfaces conditioned to inhibit scaling, oxidizing, fusing or brazing.

A further object is to provide, as an article of manufacture, a screw threaded element impervious to surface scaling under high temperatures, or to any extent prohibiting its disengagement after service by the use of the same type of tool by which it was initially engaged.

Attempts have been made to overcome thread surface seizure by lubricating the threads with grease, oil, and other mobile materials, but owing to the fact that such materials volatilize, carbonize, evaporate, and otherwise alter their character when subjected to elevated temperatures, their efficiency for the purpose is destroyed. Furthermore, the distinct lubricating action of such materials is detrimental for engaged screw threaded elements so coated are incapable of holding a tight connection and become loosened as a result of the shocks and vibration to which they are subjected in service.

I have found that graphite, or other equivalent metallic carbon, provides a seizure inhibiting material that is stable, heat resistant and non-oxidizing. Its condition does not alter under high temperatures. When applied and affixed to screw thread surfaces it coats or otherwise forms thereon a protective skin which is highly resistant to the scaling effect of high temperatures, and which very effectively prevents oxidation, fusing and brazing of the subjacent surface which it covers.

In the practice of the invention screw threaded elements are subjected to a suitable treatment, various ones of which are more fully described in my aforesaid copending application, by which graphite or other equivalent metallic carbon is applied to and fixed on the thread surfaces as a mechanically retained coating in which the material is deposited in and held by the innumerable surface crevices and cavities of the metal surface to which it is applied. It may be rolled into the surface, or may be deposited thereon as a suspension in a liquid carrier which is subsequently removed, or it may be applied in any manner deemed appropriate, so as to provide a definite coating over the entire threaded surface.

Theoretically it is possible to provide a film or coat of graphite which leaves not the slightest fracton of the subjacent area uncovered. However, as photomicrographs of metal surfaces make clearly evident, the microscopically pitted and scarred surface of a screw thread presents sufficient surface irregularities to render this impossible in practice. Small microscopic elevated areas will remain between the depressions, which areas are uncoated and exposed or which, if coated, are so thinly coated that the covering material is readily removed by a slight abrasion and particularly by the abrasion encountered when a screw threaded surface so coated is engaged with a complemental screw threaded surface, itself either coated or uncoated.

These minute exposed areas of the subjacent metal surface become oxidized and scale, but as their total combined area is so infinitely small as compared to the total coated area, and because of their mutual spacing, the resultant scaling under service conditions will be very minor indeed as compared to the scaling which would occur over the entire area of a surface to which the material had not been applied. In practice, this minor scaling is held to such low degree that engaged elements may readily be disengaged after long periods of attachment without the exercise of undue force and by use of tools of the same type by which they were initially engaged.

Also, and somewhat paradoxically, this minor scaling has an important function in that it utterly negatives the lubricating effect of the graphite. The outer fact of the graphitic coating becomes microscopically spotted with encrustations of scale so that it becomes incapable of functioning as an anti-friction coating, thus causing the graphite to behave in an unexpected or non-obvious manner; its obvious and expected action being that of a lubricator.

At the same time the minor scaling is localized and retarded to so great a degree, with respect to the total area of the treated surface, that the engaged surfaces are effectively prevented from becoming frozen, that is, thread surface seizure is held to such a small limit that after a long period of service under high temperature conditions its only effect is to render the engaged elements slightly more resistant to disengagement than when initially engaged.

For all practical purposes the thread surface seizure may be said to be eliminated, and it is in such sense that the term is employed herein.

Having thus described the invention, what is claimed is:

1. As an article of manufacture, a screw threaded fastening element having a permanent thread surface coating of a stable, non-oxidizing, heat resistant material.

2. As an article of manufacture, a screw threaded member having a permanent thread surface coating of graphite.

3. A threaded member having interstitial deposits of graphite incorporated into the faces of the threads in such a manner that when said member is threaded into a complementary member a thin film of graphite will be provided between the threads of said members, so that said members may be unscrewed after being subjected to a high temperature for a long period.

4. As an article of manufacture, a screw threaded member having a surface coating of a non-oxidizing heat resistant material physically bonded thereto.

5. As an article of manufacture, a screw threaded member having a friction producing coating consisting of graphite.

6. As an article of manufacture, a screw threaded member having a facing consisting only of graphite over its thread surfaces, said faces being interrupted at microscopic intervals by microscopic exposed areas denuded of graphite, and whose total area is minute as compared to the area covered by the facing.

7. A screw threaded member in which graphite is rolled into the threads thereof.

8. A screw threaded member in which graphite is deposited on the threads thereof from suspension in a liquid carrier which is subsequently removed.

CHARLES E. S. PLACE.